United States Patent
Jin et al.

(10) Patent No.: US 11,025,650 B2
(45) Date of Patent: Jun. 1, 2021

(54) MULTI-PATTERN POLICY DETECTION SYSTEM AND METHOD

(71) Applicant: WINS Co., Ltd., Gyeonggi-do (KR)

(72) Inventors: Yong Sig Jin, Gyeonggi-do (KR); Ji Yoon Hwang, Gyeonggi-do (KR)

(73) Assignee: WINS Co., Ltd., Gyeonggi-do (KR)

( * ) Notice: Subject to any disclaimer, the term of this patent is extended or adjusted under 35 U.S.C. 154(b) by 459 days.

(21) Appl. No.: 16/138,254

(22) Filed: Sep. 21, 2018

(65) Prior Publication Data

US 2019/0207958 A1 Jul. 4, 2019

(30) Foreign Application Priority Data

Jan. 3, 2018 (KR) .......................... 10-2018-0000794

(51) Int. Cl.
*G06F 21/00* (2013.01)
*G06F 21/55* (2013.01)
(Continued)

(52) U.S. Cl.
CPC ........ *H04L 63/1416* (2013.01); *G06K 9/6255* (2013.01); *G06K 9/6878* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 7,613,755 B1 * | 11/2009 | Venkatachary | ... G06F 16/90344 708/212 |
| 2003/0110393 A1 * | 6/2003 | Brock | .................. G06F 21/554 726/23 |

(Continued)

FOREIGN PATENT DOCUMENTS

| | | |
|---|---|---|
| KR | 100648297 B1 | 5/2010 |
| KR | 100960117 B1 | 5/2010 |

(Continued)

OTHER PUBLICATIONS

Korean Patent Abstract (in English) of KR Patent App. Pub. No. 1020100073136 A, Pub. Date Jul. 1, 2010, downloaded Sep. 3, 2018 from http://kpa.kipris.or.kr/kpa/.

(Continued)

*Primary Examiner* — Morshed Mehedi
*Assistant Examiner* — Kalish K Bell
(74) *Attorney, Agent, or Firm* — Barcelo, Harrison & Walker, LLP (57) ABSTRACT

Provided are a multi-pattern policy detection system and method, wherein, in an environment that operates a plurality of policies for determining matching or non-matching by a string or a normalized format, the plurality of policies are expressed by a data structure that is searchable at a time, and are optimized to improve search performance. The multi-pattern policy detection system includes: a search front stage optimizer configured to register a string of a signature fragment received from a signature fragment list as a registration pattern of a front stage of a signature by taking into account length and uniqueness of the string; a search rear stage optimizer configured to receive the signature fragment from the signature fragment list, and register the signature fragment as a registration pattern of a rear stage when there is no registration signature fragment of the rear stage; and a detection engine configured to perform attack detection by using the front stage of the search front stage optimizer and the rear stage of the search rear stage optimizer.

10 Claims, 7 Drawing Sheets

(51) Int. Cl.
    *G06F 21/56*     (2013.01)
    *H04L 29/06*     (2006.01)
    *G06K 9/68*     (2006.01)
    *G06K 9/62*     (2006.01)

(56) References Cited

U.S. PATENT DOCUMENTS

| | | | | |
|---|---|---|---|---|
| 2008/0010278 | A1* | 1/2008 | Kencl | H04L 63/145 |
| 2010/0192225 | A1* | 7/2010 | Ma | H04L 63/0227 |
| | | | | 726/23 |

FOREIGN PATENT DOCUMENTS

| | | | |
|---|---|---|---|
| KR | 1020100073136 | A | 7/2010 |
| KR | 100992440 | B1 | 11/2010 |
| KR | 101268510 | B1 | 6/2013 |
| KR | 101448869 | B1 | 10/2014 |
| KR | 101472522 | B1 | 12/2014 |
| KR | 101519619 | B1 | 5/2015 |
| KR | 101648033 | B1 | 8/2016 |
| KR | 101802443 | B1 | 11/2017 |

OTHER PUBLICATIONS

Korean Patent Abstract (in English) of KR Patent Pub. No. 100648297 B1, Pub. Date Dec. 20, 2006, downloaded Sep. 7, 2018 from http://kpa.kipris.or.kr/kpa/.

Korean Patent Abstract (in English) of KR Patent Pub. No. 100960117 B1, Pub. Date May 19, 2010, downloaded Sep. 7, 2018 from http://kpa.kipris.or.kr/kpa/.

Korean Patent Abstract (in English) of KR Patent Pub. No. 101448869 B1, Pub. Date Oct. 1, 2014, downloaded Sep. 7, 2018 from http://kpa.kipris.or.kr/kpa/.

Korean Patent Abstract (in English) of KR Patent Pub. No. 101472522 B1, Pub. Date Dec. 16, 2014, downloaded Sep. 7, 2018 from http://kpa.kipris.or.kr/kpa/.

Korean Patent Abstract (in English) of KR Patent Pub. No. 101519619 B1, Pub. Date May 6, 2015, downloaded Sep. 7, 2018 from http://kpa.kipris.or.kr/kpa/.

Korean Patent Abstract (in English) of KR Patent Pub. No. 101648033 B1, Pub. Date Aug. 8, 2016, downloaded Sep. 7, 2018 from http://kpa.kipris.or.kr/kpa/.

Korean Patent Abstract (in English) of KR Patent Pub. No. 101802443 B1, Pub. Date Nov. 22, 2017, downloaded Sep. 7, 2018 from http://kpa.kipris.or.kr/kpa/.

Korean Patent Abstract (in English) of KR Patent Pub. No. 100992440 B1, Pub. Date Nov. 1, 2010, downloaded Sep. 7, 2018 from http://kpa.kipris.or.kr/kpa/.

Korean Patent Abstract (in English) of KR Patent Pub. No. 101268510 B1, Pub. Date Jun. 7, 2013, downloaded Sep. 7, 2018 from http://kpa.kipris.or.kr/kpa/.

Office Action from Korean Intellectual Property Office for KR Patent Application No. 10-2018-0000794 dated Mar. 18, 2018.

* cited by examiner

FIG. 1

| | A1 | A2 | A3 |
|---|---|---|---|
| SIGNATURE A | ABC | DEF | GHI |

| | B1 | B2 | B3 |
|---|---|---|---|
| SIGNATURE B | ABC | .* | OPQRSTU |

| | C1 | C2 | C3 |
|---|---|---|---|
| SIGNATURE C | ABC | ATEST{1,100} | GHI |

FIG. 2

| A1 | → | A2 | A3 |
|---|---|---|---|
| B1 | → | B2 | B3 |
| C1 | → | C2 | C3 |

MULTI-PATTERN POLICY DETECTION SYSTEM AND METHOD

CROSS-REFERENCE TO RELATED APPLICATIONS

This application claims the benefit of, and priority to, Korean Patent Application No. 10-2018-0000794, filed on Jan. 3, 2018, in the Korean Intellectual Property Office. The entire contents of said application are incorporated herein by reference for all purposes.

BACKGROUND OF THE INVENTION

Field of the Invention

The present invention relates to a multi-pattern policy detection system and method, and more particularly, to a multi-pattern policy detection system and method, wherein, in an environment that operates a plurality of policies for determining matching or non-matching by a string or a normalized format, the plurality of policies are expressed by a data structure that is searchable at a time, and are optimized to improve search performance.

Description of the Related Art

A network equipment has a string or a list of a string format defined in advance as attacks so as to detect attack packets. This is called a signature.

The signature may be variously composed of a text string or a combination of regular expressions, including packet classification information.

The generation and management of the signature are stored in a database or as a file format similar to the database and located in a physical space. In a detection system using this, a signature file is loaded into a memory space.

A general signature search process is as follows. A single signature means one network attack or one matching result. Therefore, when a payload of a packet is given, a comparison search process is performed while sequentially traversing all signatures.

When particular conditions are assumed to be the same across different signatures, the comparison for the conditions are inevitably repeated for each signature.

A technique for avoiding repetitive comparison operations is multi-pattern matching. Multi-pattern matching configures a set of signatures into a single search data structure in a broad range.

For this purpose, the detection string of each signature is subjected to a division process. This is called a signature fragment. Duplicate fragments are removed and a signature fragment list for the entire signatures is generated on a memory.

In a conventional multi-pattern matching method, matching or non-matching of each fragment is checked while a payload of a packet traverses a signature fragment list. After the search for the entire fragments is completed, the matching signature is searched for through a combination of matched results to output a final signature detection result.

The search performance of the signature search is determined according to the structure and optimization method of loading into the memory space.

PATENT DOCUMENTS

Korean Patent Registration No. 10-1472522.

Korean Patent Application Publication No. 10-2010-0073136.

SUMMARY

One or more embodiments of the present invention provide a multi-pattern policy detection system and method, wherein, in an environment that operates a plurality of policies for determining matching or non-matching by a string or a normalized format, the plurality of policies are expressed by a data structure that is searchable at a time, and are optimized to improve search performance.

According to one or more embodiments of the present invention, a multi-pattern policy detection system includes: a search front stage optimizer configured to register a string of a signature fragment received from a signature fragment list as a registration pattern of a front stage of a signature by taking into account length and uniqueness of the string; a search rear stage optimizer configured to receive the signature fragment from the signature fragment list, and register the signature fragment as a registration pattern of a rear stage when there is no registration signature fragment of the rear stage; and a detection engine configured to perform attack detection by using the front stage of the search front stage optimizer and the rear stage of the search rear stage optimizer.

When a detection frequency of the corresponding string of the signature fragment received from the signature fragment list is lower than a detection frequency of the registration pattern of the front stage of the signature, the search front stage optimizer may register the corresponding string as the registration pattern of the front stage of the signature.

When the detection frequency of the corresponding string of the signature fragment received from the signature fragment list is lower than the detection frequency of the registration pattern of the front stage of the signature, the search front stage optimizer may compare uniqueness of the registration pattern of the front stage of the signature with uniqueness of the corresponding string, and register the corresponding string as the registration pattern of the front stage of the signature when the uniqueness of the corresponding string is higher than the uniqueness of the registration pattern of the front stage of the signature.

When the signature fragment includes a normal expression, the corresponding string of the signature fragment may be composed of a simple string extracted from the signature fragment by the search front stage optimizer.

When the search rear stage optimizer checks signature information of the signature fragment and there is a registration signature fragment, the search rear stage optimizer may register the signature fragment in a front stage of a registration signature fragment which is a current comparison target when a load influence degree is small and a detection frequency is low, so that a comparison priority is processed to be high.

According to one or more embodiments of the present invention, a multi-pattern policy detection method includes:

(A) registering, by a search front stage optimizer, a string of a signature fragment received from a signature fragment list as a registration pattern of a front stage of a signature by taking into account length and uniqueness of the string; (B) receiving, by a search rear stage optimizer, the signature fragment from the signature fragment list, and registering the string of the signature fragment as a registration pattern of a rear stage when there is no registration signature fragment of the rear stage; and (C) performing, by a search engine, attack detection by using the front stage of the search front stage optimizer and the rear stage of the search rear stage optimizer.

The multi-pattern policy detection method may further include (D) registering, by the search front stage optimizer, the corresponding string as the registration pattern of the front stage of the signature when a detection frequency of the corresponding string of the signature fragment received from the signature fragment list is lower than a detection frequency of the registration pattern of the front stage of the signature.

(D) may include comparing, by the search front stage optimizer, uniqueness of the registration pattern of the front stage of the signature with uniqueness of the corresponding string when the detection frequency of the corresponding string of the signature fragment received from the signature fragment list is lower than the detection frequency of the registration pattern of the front stage of the signature, and registering the corresponding string as the registration pattern of the front stage of the signature when the uniqueness of the corresponding string is higher than the uniqueness of the registration pattern of the front stage of the signature.

The multi-pattern policy detection method may further include: (E) checking, by the search rear stage optimizer, signature information of the signature fragment and, when there is the registration signature fragment, determining whether a load influence degree is small; (F) determining, by the search rear stage optimizer, a detection frequency when the load influence degree is small; and (G) performing, by the search rear stage optimizer, signature fragment registration when it is determined in (F) that the detection frequency is low.

(G) may include registering, by the search rear stage optimizer, the signature fragment in a front stage of the registration signature fragment which is a current comparison target, so that a comparison priority is processed to be high.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Description of the Preferred Embodiments

Hereinafter, exemplary embodiments of the present invention will be described in detail with reference to the accompanying drawings.

The terms used in the present specification are merely used to describe particular embodiments, and are not intended to limit the present invention. An expression used in the singular encompasses the expression in the plural, unless it has a clearly different meaning in the context. In the present specification, it is to be understood that terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Also, while describing the present invention, detailed descriptions about related well-known functions or configurations that may diminish the clarity of the points of the present invention are omitted.

A change from a signature traversing method to a multi-pattern matching method improves search performance by removing redundant searches.

However, the investigation of all signature fragments is performed based on matching possibility with respect to all signatures. In the worst case, as the matching result, the combination of the signature fragments may not match one or more pieces of signature information.

To this end, the present invention is configured to process a signature fragment list into a structure capable of depth search and to perform a depth search by constructing a signature fragment having the same signature information as the corresponding pattern in a rear stage when a pattern of a front stage is matched.

This makes it possible to obtain a signature matching result with fewer matching attempts than a conventional multi-pattern matching.

In particular, the signature fragment configuration of the front stage is a crucial factor that influences search performance. Therefore, the uppermost portion is defined as a search front stage, and a search node set for the subsequent signature fragments is defined as a search rear stage. The optimization is performed on each of the front stage and the rear stage.

The configuration of the front stage is composed of a representative signature fragment or a representative string of each signature. The representative signature fragment is generally extracted as follows.

The cost of the search load influence degree on the signature fragment is calculated and the fragment having the lowest cost is selected. In the configuration of the rear stage, the remaining signature fragments excluding the representative signature fragment are configured as a sequential/repetitive search structure.

Figure 1:
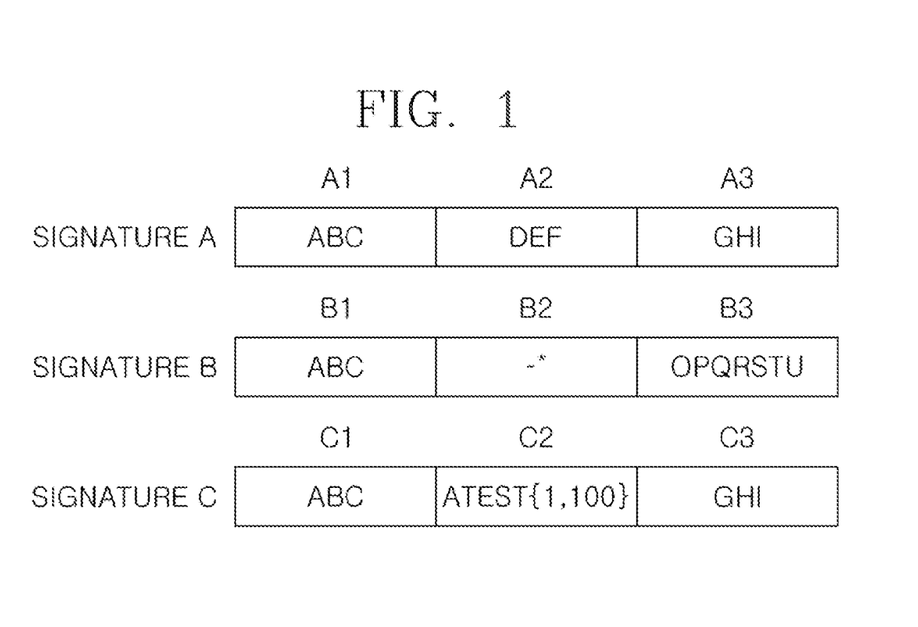
FIG. 1 is a configuration diagram of front stage/rear stage signature fragments.
Figure 2:
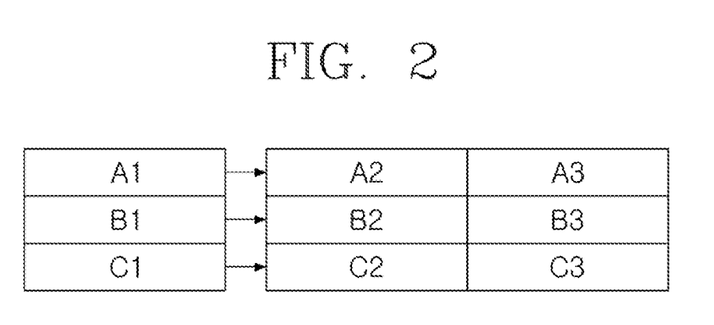
FIG. 2 illustrates a search structure before optimization.

FIG. 1 is a configuration diagram of front stage/rear stage signature fragments, and FIG. 2 illustrates a search structure before optimization.

Referring to FIGS. 1 and 2, a front stage is configured according to a load influence degree. Although calculated based on cost, the selected signature fragments are not representative of signatures or are composed of an excessive general-purpose text. Thus, there is a probability of over-detection in the front stage.

As described above, since the signature fragment configuration of the front stage is a crucial factor that influences search performance, the traffic processing performance is degraded when most of network traffics flow into the rear stage through the front stage.

Therefore, the front stage has to determine matching or non-matching and classify most of packets having a low matching probability, so as to maintain network traffic processing performance.

An additional operation on signature fragments so as to match the purpose of the front stage can be called front stage optimization.

Figure 3:
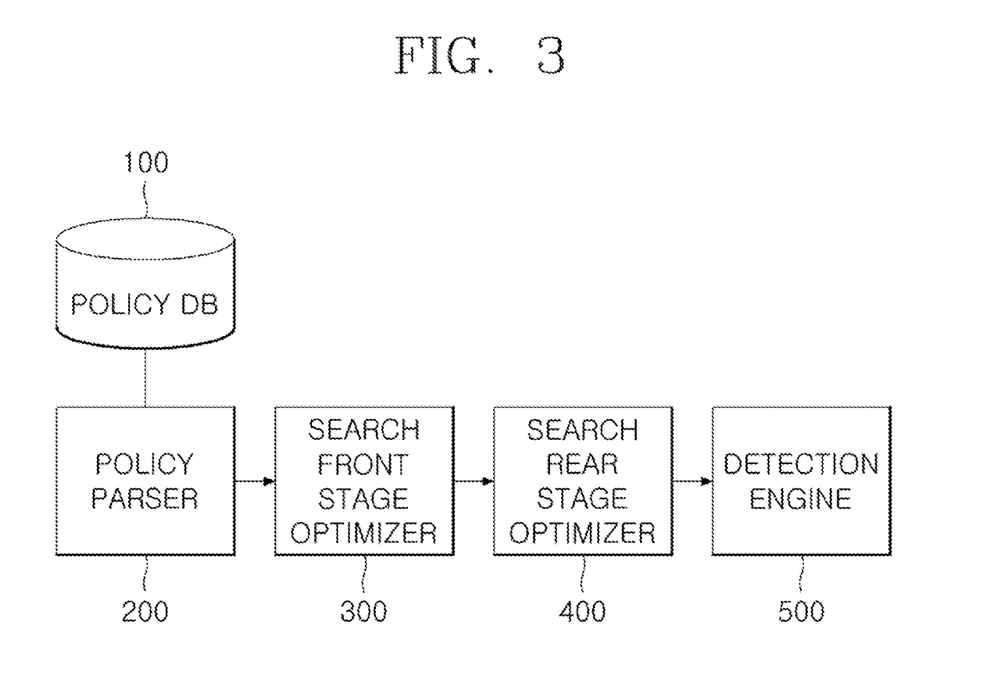
FIG. 3 is a configuration diagram of a multi-pattern policy detection system according to an embodiment of the present invention.

FIG. 3 is a configuration diagram of a multi-pattern policy detection system according to an embodiment of the present invention.

Referring to FIG. 3, the multi-pattern policy detection system according to the embodiment of the present invention includes a policy database 100, a policy parser 200, a search front stage optimizer 300, a search rear stage optimizer 400, and a search engine 500.

The policy database 100 stores and manages a plurality of policies and signature detection strings.

The policy parser 200 reads the signature detection string stored and managed in the policy database 100 and parses (divides) the read signature detection string to generate signature fragments, and removes duplicate fragments to generate a signature fragment list for the entire signatures on the database 100.

The search front stage optimizer 300 registers the string of the signature fragment received from the signature fragment list as a registration pattern of the front stage.

When the detection frequency of the corresponding string of the signature fragment received from the signature fragment list is lower than the detection frequency of the registration pattern of the front stage of the signature and the uniqueness of the corresponding string is higher than the uniqueness of the registration pattern of the front stage of the signature, the search front stage optimizer 300 registers the corresponding string as the registration pattern of the front stage of the signature.

More specifically, the optimization of the front stage, which is performed by the search front stage optimizer 300, is performed from a process of extracting a string of a predetermined length from a signature fragment included in a single signature.

The string means a sequence of characters except for regular expressions and thus may be the same as the signature fragment or part of the signature fragment.

For example, when the signature fragment includes a regular expression, a simple string is extracted from the signature fragment and used as the corresponding string.

The search front stage optimizer 300 registers the string, which is selected by taking into account the length and uniqueness of the string extracted with respect to each signature, as the signature registration pattern of the front stage.

Accordingly, as the length of the string extracted with respect to each signature is longer and the uniqueness thereof is higher, the probability that the string will be registered as the registration pattern of the front stage of the signature is higher.

Meanwhile, the search front stage optimizer 300 registers the string, which is selected by taking into account the detection frequency and uniqueness of the string extracted with respect to each signature, as the signature registration pattern of the front stage.

Accordingly, as the detection frequency of the string extracted with respect to each signature is lower and the uniqueness thereof is higher, the probability that the string will be registered as the registration pattern of the front stage of the signature is higher.

At this time, a list of patterns having low uniqueness and high detection frequency may be separately managed, and the corresponding information may be referred to so as to determine the uniqueness of the extracted string.

For example, when 80% of the incoming traffic has an A1 string, the front stage registration pattern A1 is matched and the search has to be performed on the entire signatures A, B, and C due to duplication of the front stage registration pattern.

Figure 4:
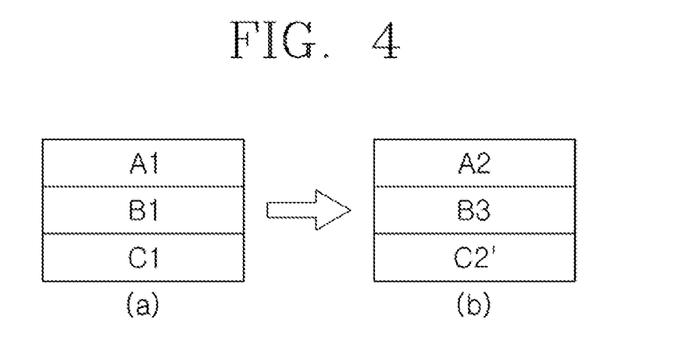
FIG. 4 is a diagram for describing a front stage optimization.

When 10% of the incoming traffic has an A2 string, only 10% of the traffic will be searched for the signature A when the detection string of the front stage registration pattern is changed from A1 to A2 as illustrated in FIG. 4.

The front stage is a set of representative registration patterns of each signature. The matching result of the front stage represents a specific signature and is an element necessary for the rear stage entry.

If the result of the front stage is quickly derived, the traffic processing performance of the network equipment also increases proportionally.

Therefore, it is possible to apply a search acceleration technique for multi-string search so as to improve the string search performance of the front stage.

Examples of the search acceleration technique include a method that uses an H/W accelerator and an S/W accelerator that is programmatically implemented. Since the front stage is composed of only a set of string patterns, it is possible to apply to the condition of the search equipment regardless of the specification of the accelerator.

The search rear stage optimizer 400 receives the signature fragment and checks the signature information. When it is determined that the registration signature fragment of the rear stage does not exist, the search rear stage optimizer 400 registers the signature fragment as the registration pattern of the rear stage.

Figure 5:
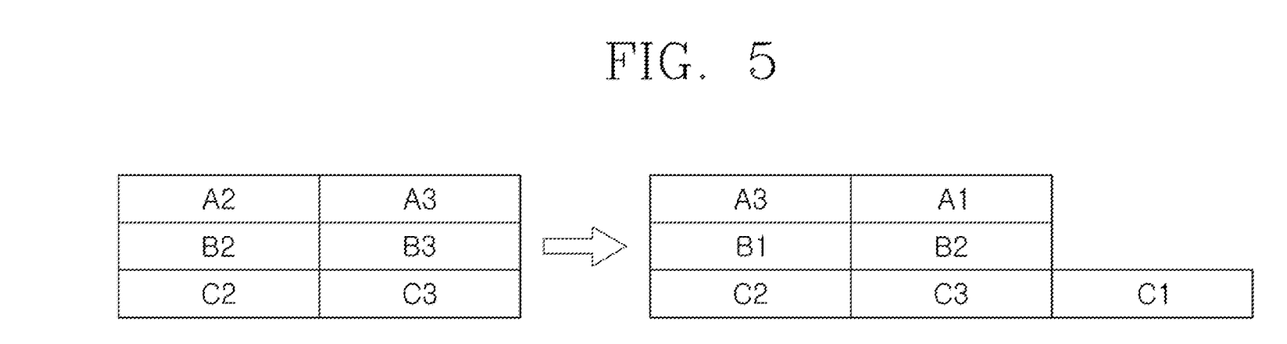
FIG. 5 is a diagram for describing a rear stage optimization.

The search rear stage optimizer 400 performs optimization on the rear stage. As illustrated in FIG. 5, the optimization of the rear stage is to determine the order of the search nodes with respect to the set of signature fragments included in the single signature.

The determination of the order of the search nodes is defined based on the cost of the calculated search load influence degree and information on the signature fragment.

In this manner, since patterns that have high search costs and require a lot of resources are arranged at the lowermost stage, packets having low matching probability due to attack are classified at the upper stage, allowing most of normal packets to pass through the system.

More specifically, when there is no registration signature fragment of the rear stage with respect to the corresponding signature, the search rear stage optimizer 400 registers the received signature fragment as the registration pattern of the rear stage.

In contrast, when there is the registration signature fragment in the rear stage, the search rear stage optimizer 400 compares the load influence degree of the registered fragment with the load influence degree of the input fragment. When the load influence degree of the input fragment is larger than the load influence degree of the registered fragment, the search rear stage optimizer 400 performs a comparison with a next fragment. When there is no additional registration fragment, the fragment is registered in the lowermost stage of the registered fragment or the rear stage of the list.

When the load influence degree of the input fragment is smaller than the load influence degree of the registered fragment, the search rear stage optimizer 400 compares the detection frequency based on the reference. When the detection frequency of the input fragment is higher than the detection frequency of the registered fragment, the search rear stage optimizer 400 performs a comparison with a next fragment. When there is no additional registration fragment, the fragment is registered in the lowermost stage of the registered fragment or the rear stage of the list.

When the detection frequency of the input fragment is lower than the detection frequency of the registered fragment, the search rear stage optimizer 400 registers the input signature fragment in the rear stage. At this time, the fragment may be registered in a front stage of the registered fragment which is a current comparison target, so that the comparison priority can be processed to be high.

Figure 6:
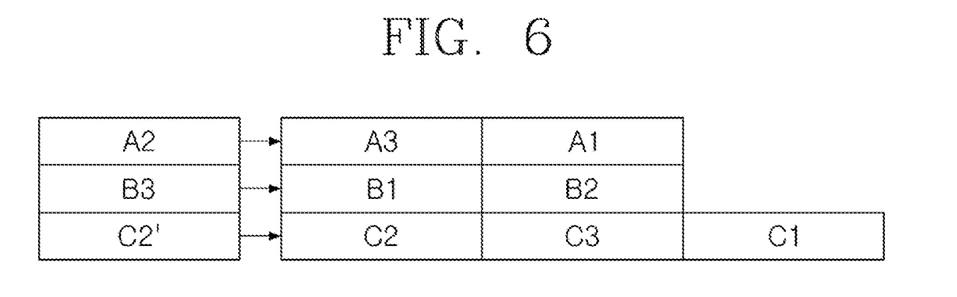
FIG. 6 illustrates a search structure after optimization.

FIG. 6 illustrates the optimization results of the front stage and the rear stage. The matching range during the attack search of the single packet may be effectively reduced, and the necessary computation cost may be reduced, thereby improving the overall search performance of the network equipment.

Meanwhile, the detection engine 500 performs detection by using the optimized results of the front stage and the rear stage.

Figure 7:
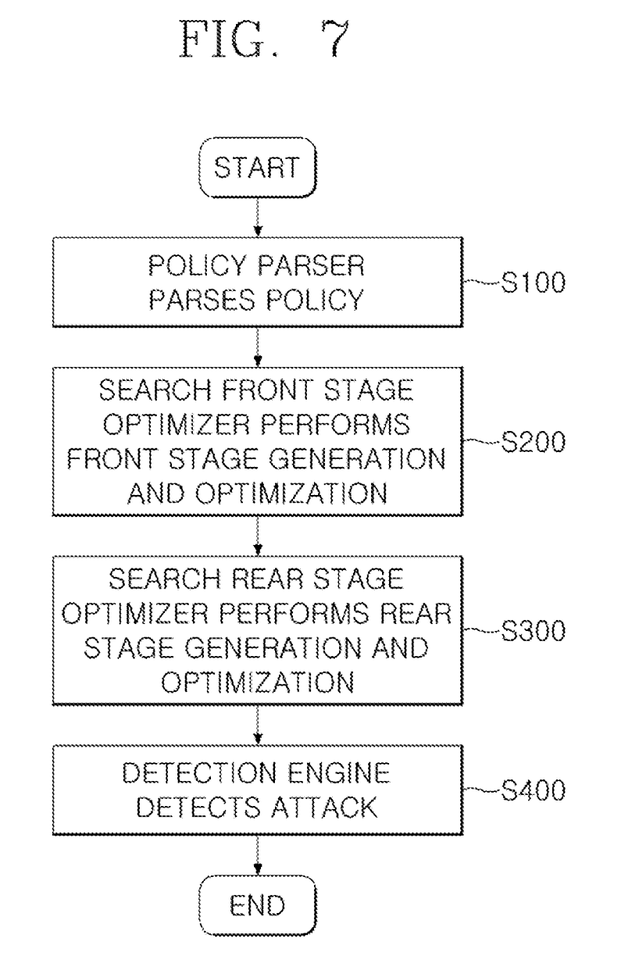
FIG. 7 is a flowchart of a multi-pattern policy detection method according to an embodiment of the present invention.

FIG. 7 is a flowchart of a multi-pattern policy detection method according to an embodiment of the present invention.

Referring to FIG. 7, in the multi-pattern policy detection method according to the embodiment of the present invention, the policy parser reads a signature detection string stored and managed in the policy database and parses (divides) the read signature detection string to generate signature fragments, and removes duplicate fragments to generate a signature fragment list for the entire signatures on the database (S100).

Then, the search front stage optimizer generates a registration pattern of a front stage of a signature and optimizes the generated registration pattern (S200).

The search rear stage optimizer generates a registration pattern of a rear stage of a signature and optimizes the generated registration pattern (S300).

Meanwhile, the detection engine 500 performs attack detection by using the optimized results of the front stage and the rear stage (S400).

Figure 8:
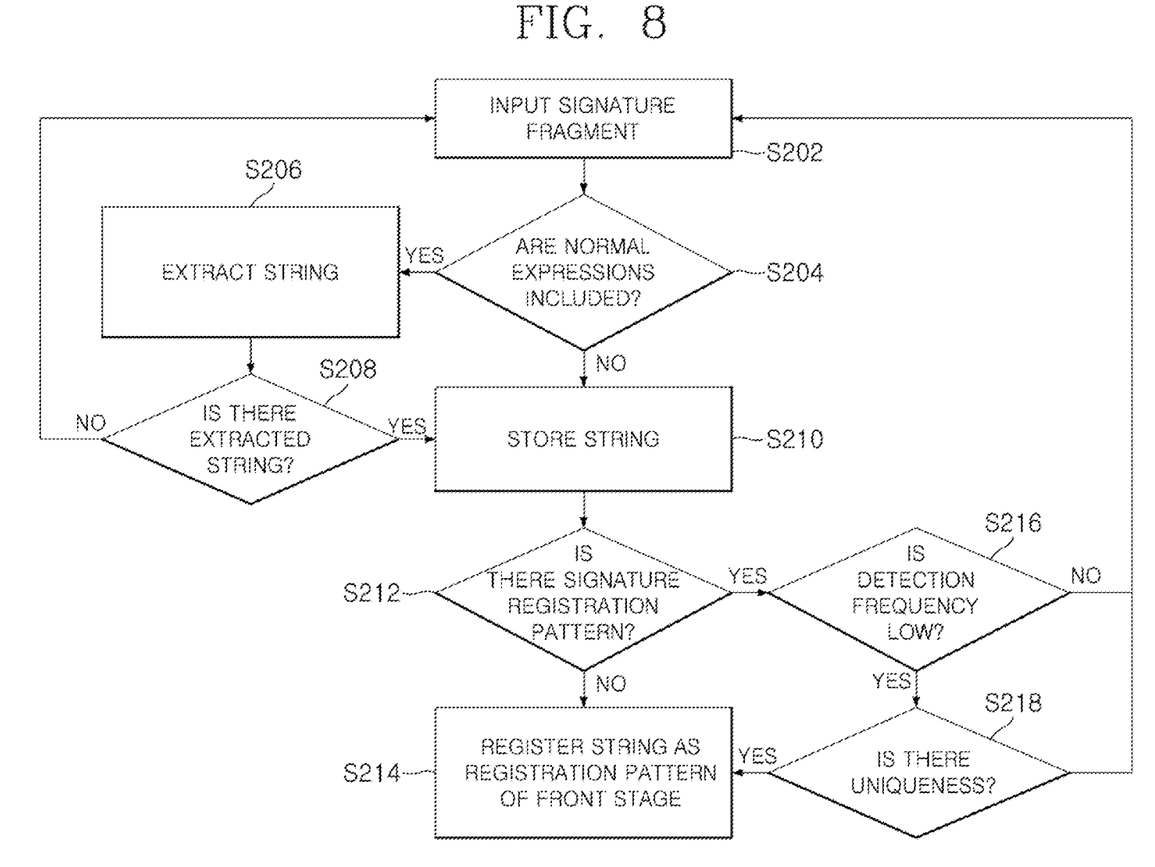
FIG. 8 is a detailed flowchart of a front stage generation and optimization process.

FIG. 8 is a detailed flowchart of a front stage optimization process.

Referring to FIG. 8, in the front stage optimization process of FIG. 7, the search front stage optimizer sequentially receives divided signature fragments from a signature fragment list including regular expressions (S202).

When the signature fragment includes regular expressions, the search front stage optimizer attempts to extract a simple string from the corresponding signature fragment (S204, S206).

Then, when there is an extracted string, the search front stage optimizer stores the corresponding string in a buffer as a temporary pattern (S208, S210).

On the other hand, when there is no extracted string, the search front stage optimizer receives a new signature fragment (S202).

When the signature fragment is composed of a simple string, the string is stored in the buffer as a temporary pattern (S204, S210).

Then, the search front stage optimizer obtains signature information from the signature fragment and confirms whether the corresponding signature is a front stage registration pattern (S212).

When there is no registration pattern of the front stage of the signature, the search front stage optimizer registers the string as a registration pattern of the front stage of the signature (S214).

On the other hand, when there is the registration pattern of the front stage of the signature, the search front stage optimizer compares the detection frequency of the registration pattern with the detection frequency of the temporary pattern based on the reference (S216).

The reference is information of a form that can be referred to with respect to a string of patterns having a high detection frequency in advance.

The search front stage optimizer does not perform the front stage registration when the detection frequency of the temporary pattern is higher than the detection frequency of the registration pattern.

On the other hand, the search front stage optimizer compares the uniqueness of the pattern when the detection frequency of the temporary pattern is lower than the detection frequency of the registration pattern (S218).

When the uniqueness of the temporary pattern is higher than the uniqueness of the registration pattern, the search front stage optimizer registers the temporary pattern stored in the buffer as the registration pattern of the front stage (S214).

When the uniqueness of the temporary pattern is lower than the uniqueness of the registration pattern, the search front stage optimizer does not perform the front stage registration.

Figure 9:
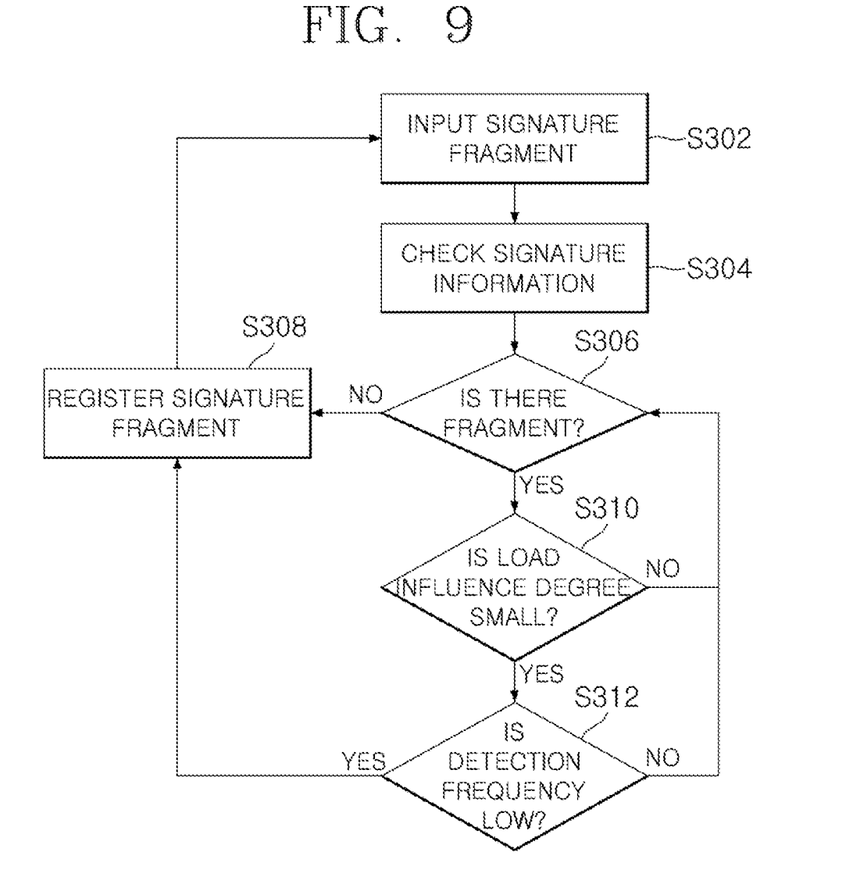
FIG. 9 is a detailed flowchart of a rear stage generation and optimization process.

FIG. 9 is a detailed flowchart of a rear stage generation and optimization process.

Referring to FIG. 9, in the rear stage generation and optimization process of FIG. 7, the search rear stage optimizer sequentially receives divided signature fragments from a signature fragment list including regular expressions (S302).

Then, the search rear stage optimizer obtains signature information from the signature fragment and determines whether there is a rear stage registration pattern (S304, S306).

When it is determined that there is no registration signature fragment of the rear stage with respect to the corresponding signature, the search rear stage optimizer registers the received signature fragment as the registration pattern of the rear stage (S308).

In contrast, when there is the registration signature fragment in the rear stage, the search rear stage optimizer compares the load influence degree of the registered fragment with the load influence degree of the input fragment (S310).

When the load influence degree of the input fragment is higher than the load influence degree of the registered fragment, the search rear stage optimizer performs a comparison with a next fragment (S306). When there is no additional registration fragment, the process proceeds to operation S308.

At this time, the fragment is registered in the lowermost stage of the registered fragment or the rear stage of the list.

When the load influence degree of the input fragment is smaller than the load influence degree of the registered fragment, the search rear stage optimizer compares the detection frequency based on the reference (S312). The reference is information of a form that can be referred to with respect to a string of patterns having a high detection frequency in advance.

When the detection frequency of the input fragment is higher than the detection frequency of the registered fragment, the search rear stage optimizer performs a comparison with a next fragment (S306). When there is no additional registration fragment, the process proceeds to operation S308. At this time, the fragment is registered in the lowermost stage of the registered fragment or the rear stage of the list.

When the detection frequency of the input fragment is lower than the detection frequency of the registered fragment, the signature fragment is registered in the rear stage (S308). At this time, the fragment is registered in the front stage of the registered fragment which is the current comparison target, so that the comparison priority can be processed to be high.

When the signature fragment is registered, the process returns to the initial operation to repeat the above-described process on a new signature fragment.

According to the present invention, the signature matching result may be obtained with fewer matching attempts than an existing multi pattern matching in an environment in which search is performed by using a plurality of signatures.

In addition, according to the present invention, the search performance of line-speed may be secured through the optimization of a front end node in the signature search for a high capacity network trunk in a high performance network equipment.

In addition, according to the present invention, the optimization may be achieved by applying the search acceleration technique depending on the environment of the search equipment without hardware dependency.

The above description is merely illustrative of the technical idea of the present invention, and various modifications and changes may be made thereto by those skilled in the art without departing from the essential characteristics of the present invention.

Therefore, the embodiments of the present invention are not intended to limit the technical spirit of the present invention but to illustrate the technical idea of the present invention, and the technical spirit of the present invention is not limited by these embodiments. The scope of protection of the present invention should be construed by the appending claims, and all technical ideas within the scope of equivalents should be construed as falling within the scope of the present invention.

What is claimed is:

1. A multi-pattern policy detection system comprising:
a processor; and
memory,
wherein the memory stores non-transitory computer-readable instructions that, when executed by the processor, include:
a search front stage optimizer configured to register a string of a signature fragment received from a signature fragment list as a registration pattern of a front stage of a signature by taking into account length and uniqueness of the string;
a search rear stage optimizer configured to receive the signature fragment from the signature fragment list, and register the signature fragment as a registration pattern of a rear stage when there is no registration signature fragment of the rear stage; and
a detection engine configured to perform attack detection by using the front stage of the search front stage optimizer and the rear stage of the search rear stage optimizer,
wherein the rear stage includes signature fragments excluding the registration pattern of the front stage among all the signature fragments included in the signature fragment list,
wherein the detection engine detects the registration pattern of the rear stage in a payload of an input packet only when there is the registration pattern of the front stage in the payload of the input packet.

2. The multi-pattern policy detection system of claim 1, wherein, when a detection frequency of the corresponding string of the signature fragment received from the signature fragment list is lower than a detection frequency of the registration pattern of the front stage of the signature, the search front stage optimizer registers the corresponding string as the registration pattern of the front stage of the signature.

3. The multi-pattern policy detection system of claim 2, wherein, when the detection frequency of the corresponding string of the signature fragment received from the signature fragment list is lower than the detection frequency of the registration pattern of the front stage of the signature, the search front stage optimizer compares uniqueness of the registration pattern of the front stage of the signature with uniqueness of the corresponding string, and registers the corresponding string as the registration pattern of the front stage of the signature when the uniqueness of the corresponding string is higher than the uniqueness of the registration pattern of the front stage of the signature.

4. The multi-pattern policy detection system of claim 1, wherein, when the signature fragment includes a normal expression, the corresponding string of the signature fragment is composed of a simple string extracted from the signature fragment by the search front stage optimizer.

5. The multi-pattern policy detection system of claim 1, wherein, when the search rear stage optimizer checks signature information of the signature fragment and there is a registration signature fragment, the search rear stage optimizer registers the signature fragment in a front stage of a registration signature fragment which is a current comparison target when a load influence degree is small and a detection frequency is low, so that a comparison priority is processed to be high.

6. A multi-pattern policy detection method comprising:
(A) registering, by a search front stage optimizer, a string of a signature fragment received from a signature fragment list as a registration pattern of a front stage of a signature by taking into account length and uniqueness of the string;
(B) receiving, by a search rear stage optimizer, the signature fragment from the signature fragment list, and registering the string of the signature fragment as a registration pattern of a rear stage when there is no registration signature fragment of the rear stage; and
(C) performing, by a search detection engine, attack detection by using the front stage of the search front stage optimizer and the rear stage of the search rear stage optimizer,
wherein the rear stage includes signature fragments excluding the registration pattern of the front stage among all the signature fragments included in the signature fragment list,
wherein the detection engine detects the registration pattern of the rear stage in a payload of an input packet only when there is the registration pattern of the front stage in the payload of the input packet.

7. The multi-pattern policy detection method of claim 6, further comprising (D) registering, by the search front stage optimizer, the corresponding string as the registration pattern of the front stage of the signature when a detection frequency of the corresponding string of the signature fragment received from the signature fragment list is lower than a detection frequency of the registration pattern of the front stage of the signature.

8. The multi-pattern policy detection method of claim 7, wherein (D) comprises comparing, by the search front stage optimizer, uniqueness of the registration pattern of the front stage of the signature with uniqueness of the corresponding string when the detection frequency of the corresponding string of the signature fragment received from the signature fragment list is lower than the detection frequency of the registration pattern of the front stage of the signature, and registering the corresponding string as the registration pattern of the front stage of the signature when the uniqueness of the corresponding string is higher than the uniqueness of the registration pattern of the front stage of the signature.

9. The multi-pattern policy detection method of claim 6, further comprising:
- (E) checking, by the search rear stage optimizer, signature information of the signature fragment and, when there is the registration signature fragment, determining whether a load influence degree is small;
- (F) determining, by the search rear stage optimizer, a detection frequency when the load influence degree is small; and
- (G) performing, by the search rear stage optimizer, signature fragment registration when it is determined in (F) that the detection frequency is low.

10. The multi-pattern policy detection method of claim 9, wherein (G) comprises registering, by the search rear stage optimizer, the signature fragment in a front stage of the registration signature fragment which is a current comparison target, so that a comparison priority is processed to be high.

* * * * *